J. O. HALVERSON & A. A. DEKUM.
STERILIZER.
APPLICATION FILED OCT. 29, 1917.

1,275,676.

Patented Aug. 13, 1918.

Inventors,
Joseph O. Halverson and
Adolph A. Dekum,
By
Attys

UNITED STATES PATENT OFFICE.

JOSEPH O. HALVERSON AND ADOLPH A. DEKUM, OF PORTLAND, OREGON.

STERILIZER.

1,275,676.

Specification of Letters Patent.

Patented Aug. 13, 1918.

Application filed October 29, 1917. Serial No. 199,010.

*To all whom it may concern:*

Be it known that we, JOSEPH O. HALVERSON and ADOLPH A. DEKUM, citizens of the United States, residing in the city of Portland, county of Multnomah, and State of Oregon, have invented certain new and useful Improvements in Sterilizers, of which the following is a specification.

Our invention relates to sterilizers of the character shown and described in our pending application, filed December 26, 1916, Serial No. 138,857, and has for its principal object to provide an improved sterilizer of the character referred to, in which it is possible, in a neat, portable and compact body, to have sterilizing means for such instruments as can be subjected to a sterilizing bath in a hot sterilizing fluid, and also to have means in connection therewith and as a part thereof, for affording a dry heat sterilizing chamber for the purpose of dry air sterilizing surgical and dental instruments, cotton pellets, gutta percha points, surgical dressings, etc., and for warming impression wax or modeling compound, and in fact for conveniently warming or heating any and all of the appliances, compositions or wrappings used by dentists, surgeons and others.

Another object of our invention is to provide in such a sterilizer a hot air sterilizing and warming chamber, with removable trays and supports, superimposed one above the other, at different distances above the source of heat, whereby it is convenient to insert and remove the objects or matter therefrom.

In order to fully explain our invention, we have shown one practical embodiment thereof in the accompanying sheet of drawings which we will now describe.

Figure 1:
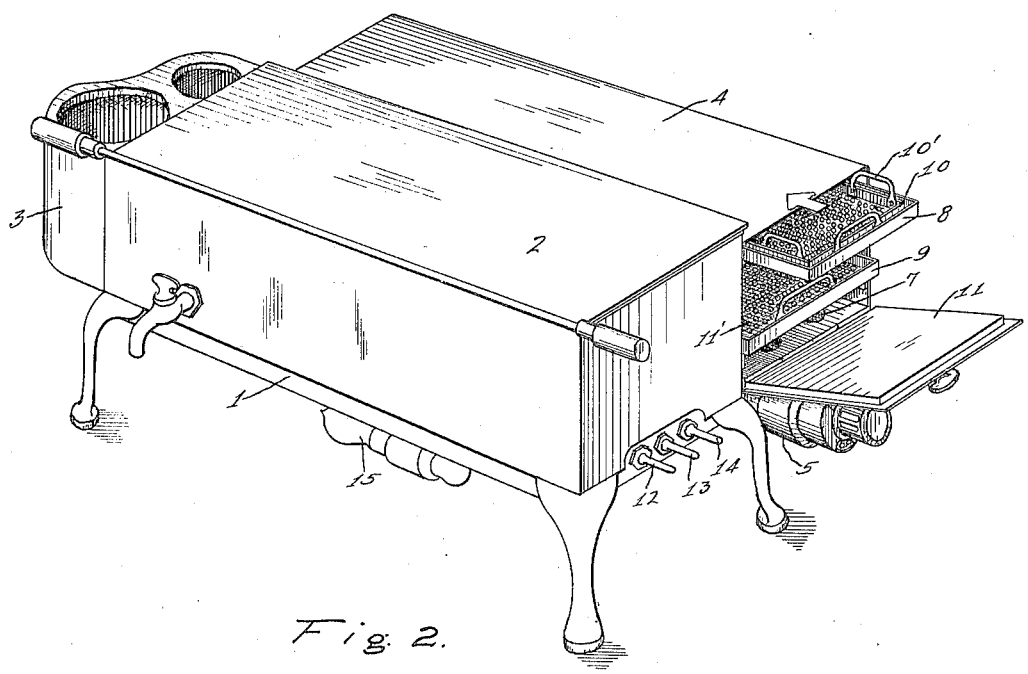
Figure 1 is a perspective view of our improved sterilizer.
Figure 2:
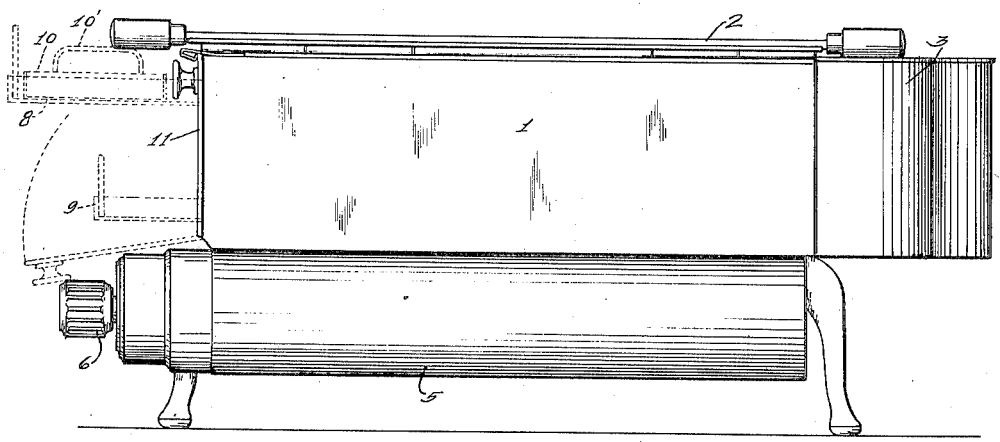
Fig. 2 is a side elevation thereof, from the farther side of Fig. 1.

In the drawings, 1 designates the main body, or box, provided with a hinged top or cover 2, which is substantially the same as that shown in Patent No. 1,117,039, issued to applicant Halverson herein, November 10, 1914. Mounted on one end of said body 1, is an extension 3, adapted to be heated from the body 1, and to receive a glass or other suitable receptacle, as may be desired.

Mounted at the side of the body 1, is a dry air box or housing, 4, provided on its under side with an electrical heating coil device 5, adapted to be controlled by a snap switch 6. The bottom of said box 4 is provided with openings, as 7, to permit the heat to pass up through the bottom of the box and also to permit of a limited circulation of hot air. Trays 8 and 9 are removably mounted in said box or housing, as indicated, which trays may be provided with removable holders, or trays, as 10, set therein, as indicated, and provided with handles, as 10'. The trays are preferably made of perforated material, or other open material, whereby the objects or matter placed therein will get the full benefit of the heat. The box 4 is provided with an end door, 11, adapted to drop down, as shown.

The main body is electrically heated, as indicated, by the terminal pins, 12, 13 and 14, in the end thereof, and is also provided with a pilot lamp, 15, thereunder, to indicate that the current is on.

Thus we have provided a simple, compact and practical sterilizer having means for sterilizing by means of a bath, or by means of a dry heat, and also provided with means for heating other receptacles, such as a drinking glass of water or other rinsing fluid, all constructed and built up as a self-contained article, and while we are aware that changes can be made in the details as here shown without departing from the spirit of the invention, we do not limit the invention to this particular showing, except as we may be limited by the hereto appended claims.

We claim:

1. A sterilizing device comprising a structure having a sterilizing liquid-holding chamber, a hinged lid therefor, adapted to fully cover said chamber, means for heating said chamber, an extension supported at one end thereof with a common wall therebetween, whereby said extension is heated interiorly from said liquid-holding chamber, said extension being provided with a top having holes therein adapted to fit around a drinking glass and receptacle, whereby both are heated within said extension from said liquid-holding chamber, substantially as shown and described.

2. In a device of the character shown and described, a structure having a bath sterilizing chamber with cover therefor, a hot air sterilizing chamber open at its end, and an open chamber adapted to receive a glass or the like, means for heating said several chambers, and removable trays adapted to be inserted by a horizontal movement into the open end of said hot air sterilizing chamber, substantially as described.

3. A device of the character shown and described, comprising in combination, a box with cover, a box mounted along one side thereof and open at one end and having openings through its bottom, means for heating the same through said openings, removable trays adapted to be inserted through said open end, a closure for said open end, and an open extension mounted on said first box and adapted to receive a drinking glass or the like, substantially as described.

4. A device of the character referred to comprising a structure having a box portion with cover therefor and a box portion with an end door therefor, removable trays for said box portion adapted to be inserted into the end thereof, and a glass-holding extension mounted on said box portion and adapted to be heated therefrom, for holding a drinking glass or the like, substantially as described.

Signed at Portland, Multnomah county, Oregon, this 20th day of October, 1917.

JOSEPH O. HALVERSON.
ADOLPH A. DEKUM.

Witnesses:
GEORGE P. DEKUM,
ELSIE M. JENSEN.